W. A. EBSEN.
OIL CARRYING SHIP OR BARGE.
APPLICATION FILED JULY 13, 1920.
1,410,287.
Patented Mar. 21, 1922.
6 SHEETS—SHEET 2.
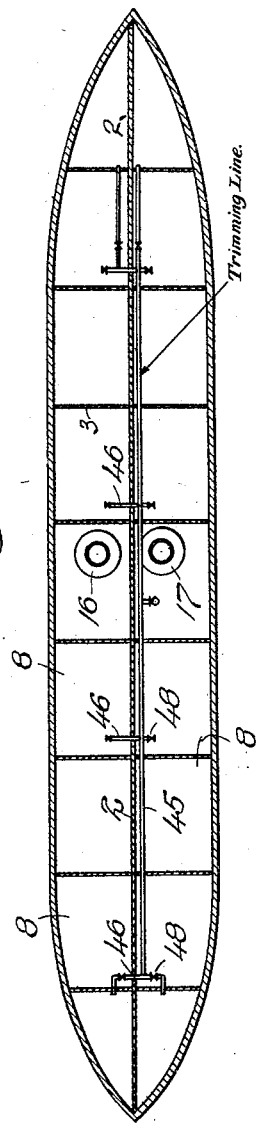
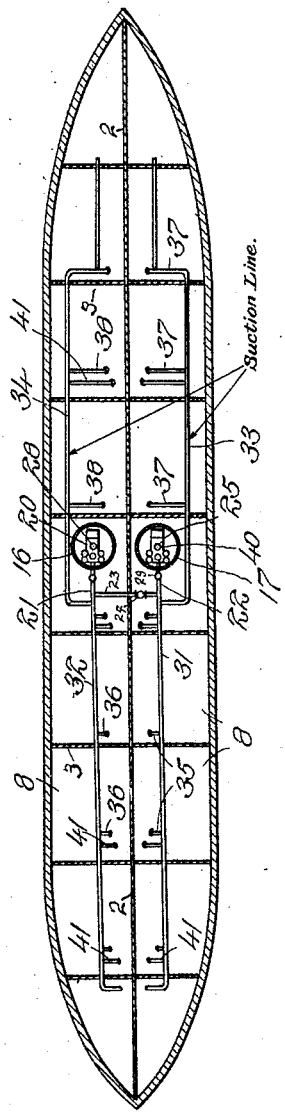
Inventor
William A. Ebsen, by
Attorney

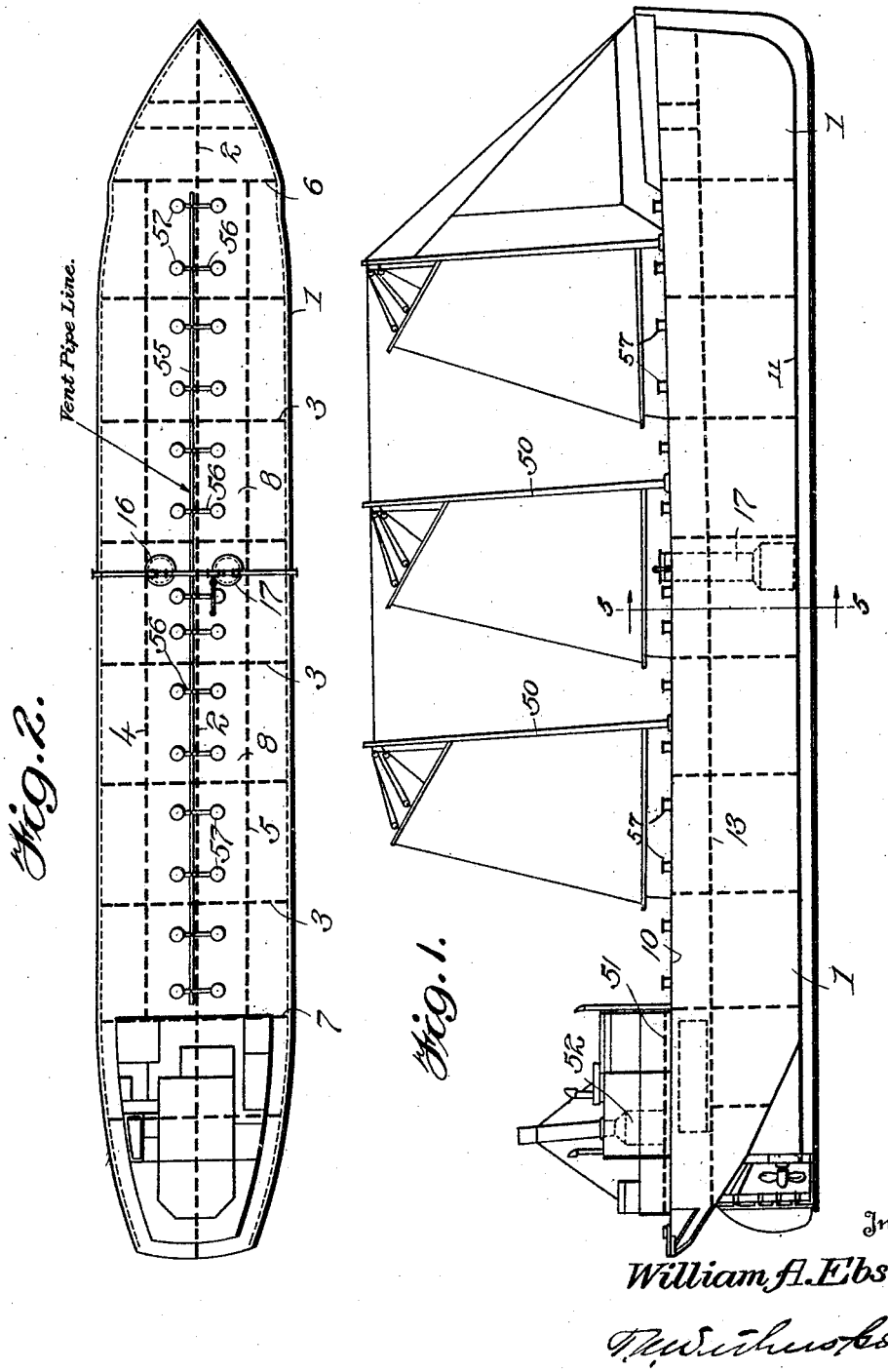

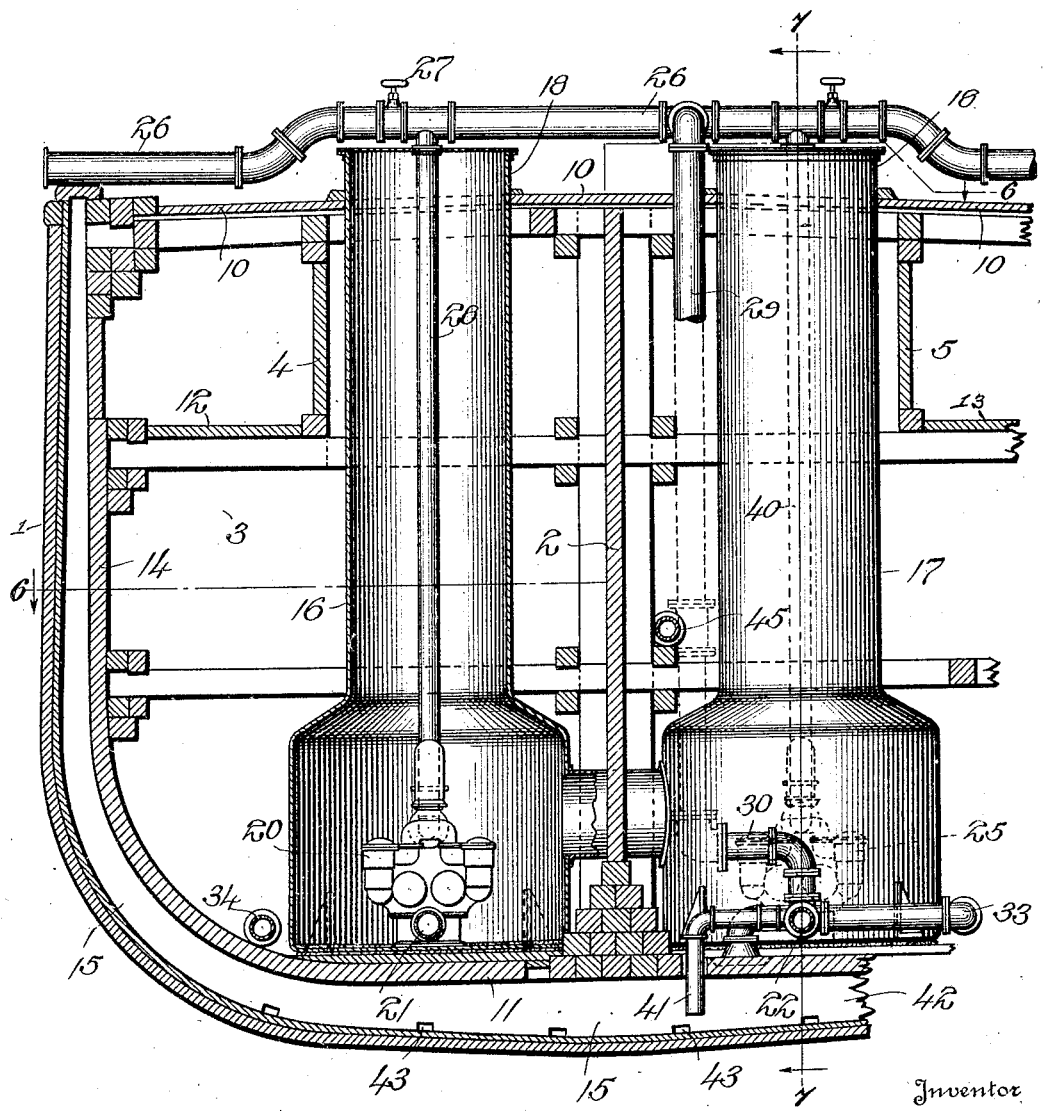

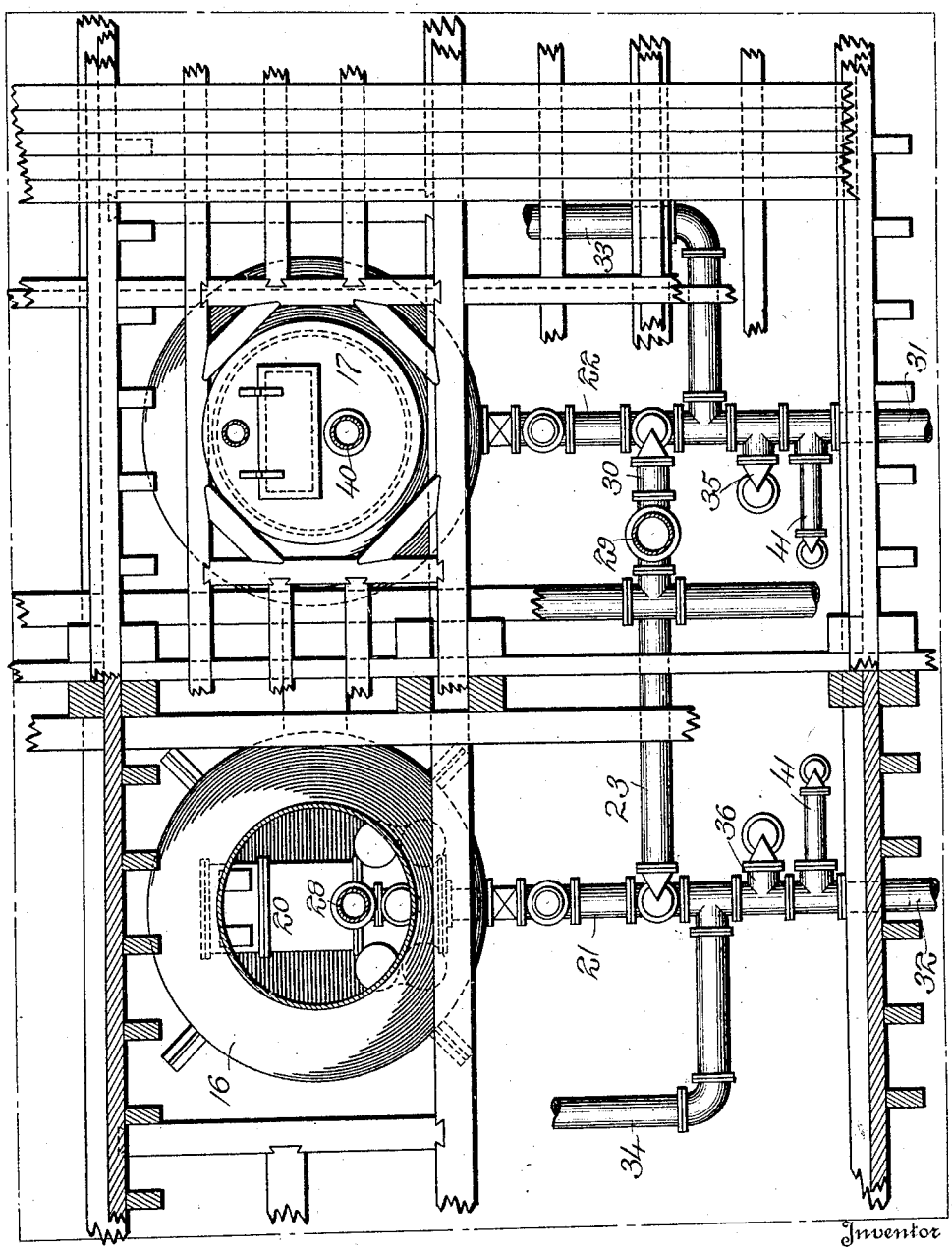

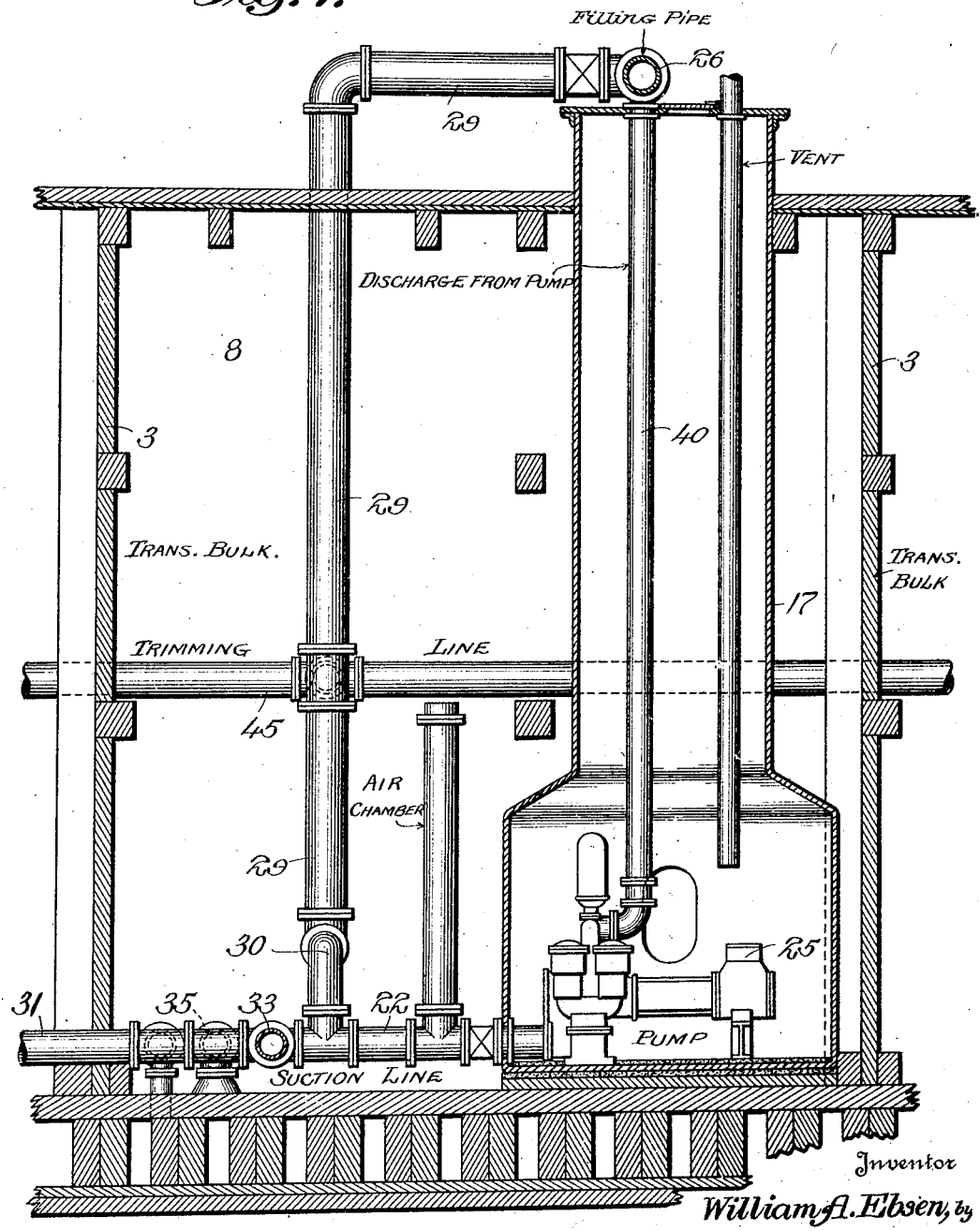

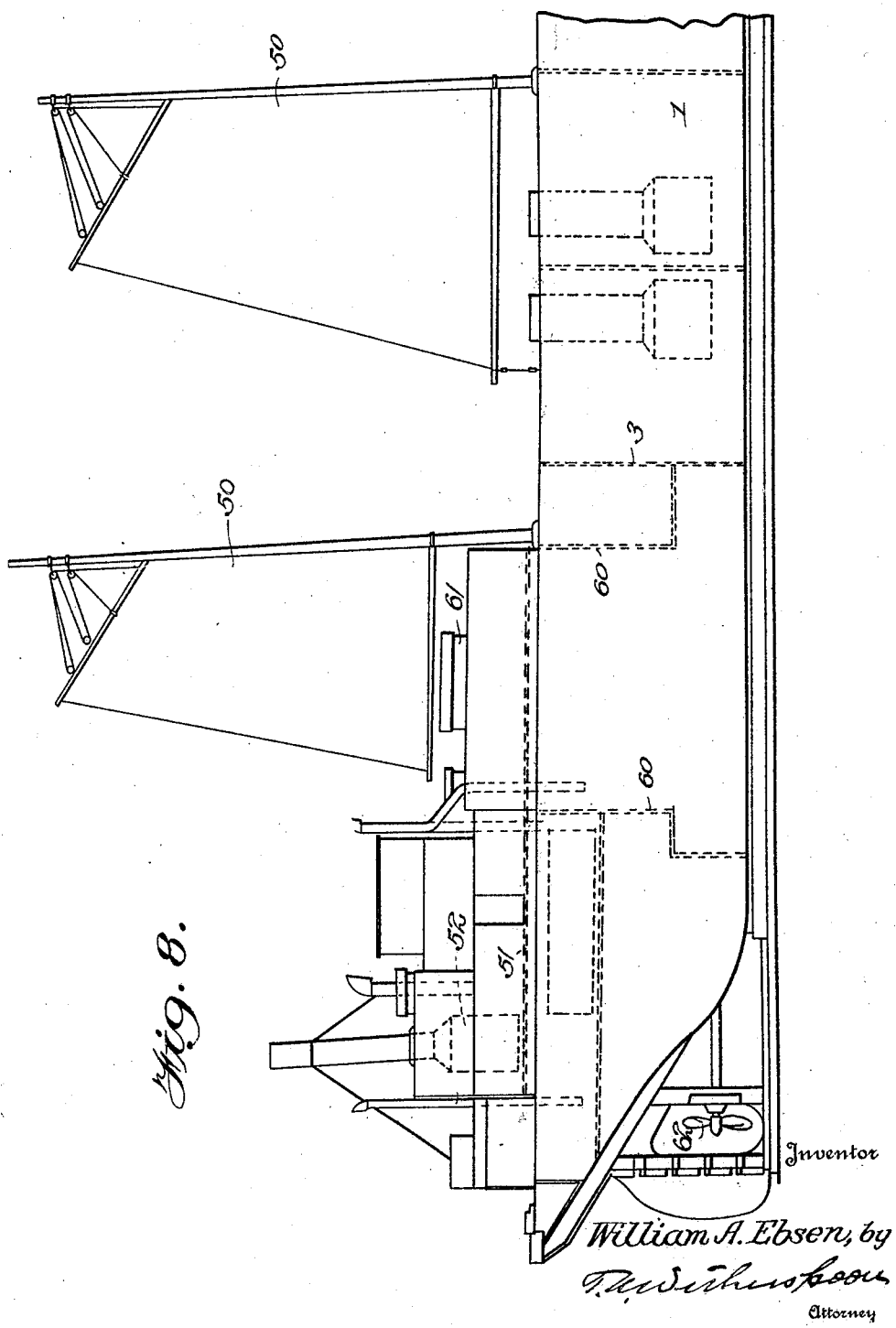

UNITED STATES PATENT OFFICE.

WILLIAM A. EBSEN, OF MONTCLAIR, NEW JERSEY, ASSIGNOR TO NATIONAL OIL COMPANY, OF NEW YORK, N. Y., A CORPORATION OF NEW JERSEY.

OIL-CARRYING SHIP OR BARGE.

1,410,287. Specification of Letters Patent. Patented Mar. 21, 1922.

Application filed July 13, 1920. Serial No. 395,829.

*To all whom it may concern:*

Be it known that I, WILLIAM A. EBSEN, a citizen of the United States, residing at Montclair, in the county of Essex and State of New Jersey, have invented certain new and useful Improvements in Oil-Carrying Ships or Barges; and I do hereby declare the following to be a full, clear, and exact description of the invention, such as will enable others skilled in the art to which it appertains to make and use the same.

This invention relates to oil carrying ships or barges and has for its object to provide a hull which will be less expensive to construct and more efficient in handling the oil in bulk than those heretofore proposed.

With these and other objects in view the invention consists in the novel details of construction and combinations of parts more fully hereinafter described, and particularly pointed out in the claims.

Referring to the accompanying drawings forming a part of this specification in which like numerals designate like parts in all the views:

Figure 1 is a diagrammatic side elevational view of a hull made in accordance with this invention;

Figure 2 is a diagrammatic plan view of the parts shown in Figure 1;

Figure 3 is a diagrammatic horizontal sectional view illustrating the trimming portion of the pipe system;

Figure 4 is a view similar to Figure 3 but illustrating diagramatically the suction portion of the pipe system.

Figure 5 is a diagrammatic cross sectional view taken approximately on the line 5—5 of Figure 1, looking in the direction of the arrows;

Figure 6 is a diagrammatic sectional plan view taken on the line 6—6 of Figure 5 looking down;

Figure 7 is a diagrammatic vertical sectional view taken on the line 7—7 of Figure 5 looking in the direction of the arrows; and Figure 8 is a fragmentary diagrammatic side elevational view of a vessel equipped with a slightly modified form of the invention.

1 indicates the outer skin of any suitable floating structure such as a ship, or barge of the well known Ferris type, 2 represents a midship longitudinal bulk head preferably extending from stem to stem of the vessel to give rigidity thereto, and 3 represents a plurality of transverse bulk heads extending from side to side of the hull.

As will be clear from Figures 1, 2, and 5, said bulk heads 2 and 3 extend from the upper deck 10 to the tank top, or inner bottom 11 of the hull. Below the upper deck 10, are a pair of lower, or half decks, 12 and 13, and on each side of said bulk head 2 and extending from said decks 12 and 13 to said deck 10 are the longitudinally disposed partial bulk heads 4 and 5, which terminate in the forward portion of the vessel at the transverse bulk head 6, and in the after portion of the vessel at the transverse bulk head 7.

It thus results that the main body portion of the vessel is divided into oil holding compartments 8, which extend from side to side between the inner side walls or skin 14 of the vessel, and from the top deck 10 to the inner bottom 11.

It is found to be entirely practical commercially to build oil carrying vessels of wood according to my prior Patent #1276042, August 20, 1918, for wooden tank vessels, and to then divide up their holds in the manner indicated, and it is further found to be unnecessarily expensive to make all the tanks 8 absolutely oil tight as was contemplated in said patent.

Accordingly in carrying out this invention I do not incur the expense of making the tanks 8 absolutely oil tight when subjected to the racking strains of a sea way, but I adopt a less costly construction which will permit them, eventually, to leak, and the oil to find its way into the spaces 15, Figure 5, between the inner skin 14 and the outer skin 1, all as will appear more fully hereinafter.

Resting upon the inner bottom 11, are one or more caissons, or oil tight steel compartments 16 and 17, into which the oil cannot enter at all, and the tops 18 of which extend well above the upper deck 10. Into the caisson 16 I place one of the main pumps 20, and into the caisson 17 I place another of the main pumps 25.

In order to readily fill the compartments with oil and to readily discharge the same, I provide a main intake and discharge pipe 26 which may conveniently be attached to any suitable oil supply not shown, whereupon by operating the pumps or by merely opening the valve 27 when there is a head of oil, the latter will flow into the pipes 28 and 29, as will be clear from Figures 5 and 7. But pipe 28 being on the force side of the pump 20, said oil will go no further therein. Said oil will, however, flow down the pipe 29 to the pipe 30 as indicated in dotted lines, Figure 5, and full lines, Figure 6, to the pipe 22, to the pipe 23, and to the pipe 21, all as will be clear from Figures 4, 5, 6 and 7. Oil under pressure being now in the pipes 22 and 21, it is readily carried aft along the distributing mains 31 and 32, see Figures 4 and 6, and forward along the mains 33 and 34.

From the main 31 the oil is distributed into the various compartments 8 through the branch pipes 35; from the main 32 it is distributed into said compartments 8 through the branch pipes 36; from the main 33 it is distributed into said compartments through the branch pipes 37; and from the main 34, said oil is distributed through the branch pipes 38, all as will be clear from Figures 4 and 6.

When it is desired to discharge the oil from the compartments 8, it is only necessary to manipulate suitable valves not shown, and to start one or both of the pumps 20 or 25, whereupon the oil will be sucked from the said mains 31, 32, 33, and 34 and their appropriate branch pipes into the force sides of the pumps from which it will be discharged through the pipes 28 and 40 into the main discharge pipe 26, all as will be clear from Figures 4, 5, 6 and 7. Of course, suitable valves are placed in any and all pipes wherever they are needed, so that oil may be cut off from or let into, any compartment desired.

As stated above, in order to lessen the cost of construction, the compartments 8 are not made perfectly oil tight, and therefore a very considerable portion of the oil will find itself in the spaces 15 between the outer and inner skin of the hull. This oil, of course, must be pumped out of said spaces when desired, and to this end the mains 31, 32, 33, and 34 are each provided with the suction connections 41, Figures 4 and 5, leading into said spaces 15, wherever convenient, and therefore oil may be readily sucked through said connections 41, said mains, and forced into said discharge pipes 28 and 40 whenever the pumps are running. In order to facilitate the passage of the oil from one of the spaces 15 into another, the transverse frames 42 of the vessel are provided with orifices 43, see Figure 5, which enable the oil to pass along the inside of the outer skin from one space to another, and thus may all of the said spaces 15 be cleared of oil whenever it is desired to do so.

Again, since the compartments 8 are not oil tight as stated above, some of them will retain oil much better than will others, and therefore oil will collect in some of the compartments more readily than it will in others, and thus tend to destroy the trim of the ship. This uneven distribution of the oil might be of considerable disadvantage in heavy seas, and to avoid this objection I provide what is known as a trimming pipe line which is best illustrated in Figure 3. This said pipe line comprises the main pipe 45 located near the longitudinal midship bulk head 2, and is provided with the branches 46 communicating with alternate compartments 8 on one side of the bulk head 2 and also with the branches 48 of the other side of the said bulk head which likewise communicate with alternate compartments 8. Said pipe 45 as best shown in Figure 5 communicates with the pipe 29 and therefore with the entire suction system of pipes. It thus results that when oil collects in one compartment or in one set of compartments, to an objectionable extent, by suitably manipulating valves not shown, the oil may flow from any compartment through the various pipes disclosed into any other compartment and thus may the trim of the ship be restored.

It will now be clear that this invention involves the providing of any suitable hull whether it be steel, wood, or other material, and whether it be of a ship or of a barge, with longitudinal and transverse bulk heads, forming compartments which are not necessarily oil tight and that therefore a considerable saving in cost is effected. Said invention also comprises the providing of such a hull with a system of piping adapted to receive the cargo of oil through the pipe 26. Also by means of the distributing mains 31, 32, 33, and 34 the placing of said oil in the various compartments is effected, thus enabling one to quickly load the vessel with oil. Said invention further comprises the suction connections 41, etc., for sucking out the oil in the spaces 15 and from between the transverses 42, that may have leaked into the said spaces. The delivery not only of this said last mentioned oil but of the oil in the tanks 8 is effected through the said pipes 28 and 48, the original intake pipe 26 and their connections to any place desired. In other words, this invention enables the operator to build a wooden ship, for example, substantially in accordance with said prior Patent #1276042 but at a somewhat less cost, and to employ the same set of piping for taking in the cargo and for discharging the same, thus saving very considerably not only in the cost of construction but also producing a higher efficiency of operation than has been heretofore possible. This invention still further comprises the trimming of the liquid cargo when it has become displaced, by means of the trimming pipe line illustrated in Figure 3, and thus keeping the vessel in trim during heavy weather.

In addition to the above, the invention involves the further features now to be disclosed.

It being very desirable that vessels of this character be provided with a propelling means, whether the vessel be a ship or a barge, I may provide the sail power indicated by the numeral 50 when desired. The after portion of the hull is fitted with an extra deck 51 which is spaced say two feet above the upper deck 10, and on this said deck 51 may be placed a boiler 52 for operating the oil pumps, fire pumps, the bilge pumps, and the deck machinery. The space between the deck 51 and the deck 10 being an air space, it serves as a considerable protection against fire.

55, Figure 2, represents a pipe line running down the longitudinal center of the hull and provided with branches 56 to each of the oil tight hatches 57. It thus constitutes a relief pipe or vent, to permit air, or vapors, to escape when filling the tanks, and also to provide a communication with the atmosphere at all times, so that there will be neither a pressure nor a vacuum in any of the tanks to militate against the filling and unloading operations.

In some cases it is desirable to provide a power propulsion also, and to meet this requirement, I provide a steel oil tight compartment or caisson 60, see the modification illustrated in Figure 8, in which caisson there may be placed a Diesel engine, or there may be placed any other type of engine therein. Should a Diesel engine be employed, suitable connections, not shown, to the propeller 62 are provided, and the boiler 52 located upon the auxiliary deck 51 supplies steam to the pumps, the deck machinery, etc. But in case a steam engine should be employed, in said caisson 60 steam is piped to it from the said boiler 52.

Of course, other additional features not shown may be provided, such, for example, as a line of pipe conveying steam to be used for smothering any fires which might occur in different tanks. Also heating coils, or other apparatus fed by steam may be employed in the various tanks to render the oil more fluid and easier to handle.

It will now be clear that as stated above, this invention by producing a less costly construction of tanks which are permitted to leak, by providing pumping means such as 20 and 25 in the steel compartments, or caissons 16 and 17, by employing the same system of piping for getting the oil aboard and for forcing it out of the hold, by providing the suction connections 41 with the spaces 15 below the inner bottom, by providing the auxiliary deck 51 and locating the steam boiler 52 thereon away from the oil, and by providing the other features mentioned, including the trimming line of piping and the vent line of piping, one is enabled to carry oil in wooden ships in a manner very much less costly and far more efficiently than has heretofore been possible. The same remarks apply to barges.

It is obvious that those skilled in the art may vary the details of construction as well as the arrangement of parts without departing from the spirit of the invention, and therefore it is not desired to be limited to the above disclosure except as may be required by the claims.

What is claimed is:—

1. In an oil carrying hull having a top deck the combination of an inner and outer skin with a space between them; a longitudinal bulk head; a plurality of transverse bulk heads dividing said hull into oil carrying compartments capable of leaking oil into said space; an oil tight metal compartment reaching from above the top deck to the bottom of the hold; a pump in said compartment; a system of piping connected to said pump adapted to fill said oil compartments and to discharge the oil therefrom; and a suction connection between said pump and said space for discharging any oil that may have leaked therein, substantially as described.

2. In an oil carrying hull having a top deck the combination of an inner and an outer skin with a space between them; longitudinal and transverse bulk heads forming compartments capable of leaking oil into said space; an oil tight compartment reaching above said top deck; a pump in said last named compartment; a pipe system connected to said pump for carrying oil to and from said first named compartments during the loading and unloading operations; connections with said pipe system for sucking oil out of said space; and a pipe system also connected to said first named compartments and said pump for moving oil from one compartment to another to trim the vessel, substantially as described.

3. In an oil carrying hull having a top deck the combination of an inner and an outer skin with a space between them; longitudinal and transverse bulk heads forming compartments capable of leaking oil into said space; an oil tight compartment reaching above said top deck; a pump in said last named compartment; a pipe system connected to said pump for carrying oil to and from said first named compartments during the loading and unloading operations; a pipe system connected with the outer atmosphere for venting said first named compartments during said loading and unloading operations; connections with said first named pipe system for sucking oil out of said space; and a pipe system also connected to said first named compartments and said pump for moving oil from one compartment to another to trim the vessel, substantially as described.

4. In an oil carrying hull having a top deck the combination of an inner and an outer skin with a space between them; a longitudinal bulk head; a plurality of transverse bulk heads dividing said vessel into oil carrying compartments capable of leaking oil into said space; an oil tight metal compartment reaching from above the top deck to the bottom of the head; a pump in said compartment; a system of piping connected to said pump adapted to fill said oil compartments and to discharge the oil therefrom; an auxiliary deck spaced above said top deck; a steam generator located on said auxiliary deck for operating said pump; and a suction connection between said pump and said space for discharging any oil that may have leaked therein, substantially as described.

5. In an oil carrying hull having a top deck the combination of an inner and an outer skin with a space between them; longitudinal and transverse bulk heads forming compartments capable of leaking oil into said space; an oil tight compartment reaching above said top deck; a pump in said last named compartment; an auxiliary deck spaced above said top deck; a steam generator for operating said pump located on said top deck; a pipe system connected to said pump for carrying oil to and from said first named compartments during the loading and unloading operation; connections with said pipe system for sucking oil out of said space; and a pipe system also connected to said first named compartments and said pump for moving oil from one compartment to another to trim the vessel, substantially as described.

6. In an oil carrying wooden vessel having a top deck the combination of inner and outer skins of wood with spaces between them; compartments whose walls are of wood and adapted to leak oil into said spaces; a plurality of oil tight compartments extending from the inner bottom of said vessel to points above said top deck; a pump in each of said last named compartments; a pipe system comprising distributing mains connected with said first named compartments and said pumps adapted to load and unload the vessel; connections between said pumps and said spaces; a vessel trimming pipe system connected to said pumps and said first named compartments; and a venting pipe system to facilitate the loading and discharge of said first named compartments, substantially as described.

7. In an oil carrying wooden vessel having a top deck the combination of inner and outer skins of wood with spaces between them; compartments whose walls are of wood and adapted to leak oil into said spaces; a plurality of oil tight compartments extending from the inner bottom of said vessel to points above said top deck; a pump in each of said last named compartments; an auxiliary deck located above said top deck; a steam generator on said auxiliary deck for operating said pumps; a pipe system comprising distributing mains connected with said first named compartments and said pumps adapted to load and unload the vessel; connections between said pumps and said spaces; a vessel trimming pipe system connected to said pumps and said first named compartments; and a venting pipe system to facilitate the loading and discharge of said first named compartments, substantially as described.

In testimony whereof I affix my signature.

WILLIAM A. EBSEN.